(12) United States Patent
Bonomo et al.

(10) Patent No.: US 12,514,893 B2
(45) Date of Patent: Jan. 6, 2026

(54) FOOD SUPPLEMENT FOR USE AS COADJUVANT IN THE PREVENTION AND TREATMENT OF COGNITIVE DECLINE ASSOCIATED WITH ALZHEIMER DISEASE

(71) Applicant: CRISTALFARMA S.R.L., Milan (IT)

(72) Inventors: Francesco Bonomo, Milan (IT); Maria Cristina Del Bono, Milan (IT)

(73) Assignee: CRISTALFARMA S.R.L., Milan (IT)

( * ) Notice: Subject to any disclaimer, the term of this patent is extended or adjusted under 35 U.S.C. 154(b) by 275 days.

(21) Appl. No.: 18/289,779

(22) PCT Filed: Apr. 22, 2022

(86) PCT No.: PCT/IB2022/053781
§ 371 (c)(1),
(2) Date: Nov. 7, 2023

(87) PCT Pub. No.: WO2022/238793
PCT Pub. Date: Nov. 17, 2022

(65) Prior Publication Data
US 2024/0285713 A1    Aug. 29, 2024

(30) Foreign Application Priority Data
May 14, 2021 (IT) .......... 102021000012515

(51) Int. Cl.
| | | |
|---|---|---|
| *A61K 36/68* | (2006.01) | |
| *A61K 9/00* | (2006.01) | |
| *A61K 31/122* | (2006.01) | |
| *A61K 31/355* | (2006.01) | |
| *A61K 31/685* | (2006.01) | |
| *A61K 36/81* | (2006.01) | |
| *A61K 47/02* | (2006.01) | |
| *A61K 47/12* | (2006.01) | |
| *A61K 47/26* | (2006.01) | |
| *A61K 47/36* | (2006.01) | |
| *A61P 25/28* | (2006.01) | |

(52) U.S. Cl.
CPC ............ *A61K 36/68* (2013.01); *A61K 9/0095* (2013.01); *A61K 31/122* (2013.01); *A61K 31/355* (2013.01); *A61K 31/685* (2013.01); *A61K 36/81* (2013.01); *A61K 47/02* (2013.01); *A61K 47/12* (2013.01); *A61K 47/26* (2013.01); *A61K 47/36* (2013.01); *A61P 25/28* (2018.01)

(58) Field of Classification Search
None
See application file for complete search history.

(56) References Cited

U.S. PATENT DOCUMENTS

2010/0021533 A1    1/2010   Mazed et al.

FOREIGN PATENT DOCUMENTS

| WO | 2014025905 A1 | 2/2014 |
|---|---|---|
| WO | 2014025905 A9 | 2/2014 |
| WO | 2021029395 A1 | 2/2021 |

OTHER PUBLICATIONS

Miroddi M et al., "Systematic review of clinical trials assessing pharmacological properties of *Salvia* species on memory, cognitive impairment and Alzheimer's disease", CNS Neuroscience & Therapeutics, vol. 20, No. 6, Jun. 1, 2014, pp. 485-495.
Search Report and Written Opinion of PCT/IB2022/053781 issued Sep. 9, 2022.
Sehgal N. et al., "Withania somnifera reverse Alzheimer's disease pathology by enhancing low-density lipoprotein receptor-related protein in liver", Proceedings of the National Academy of Sciences, vol. 109, No. 9, Feb. 28, 2012, pp. 3510-3515.
Tildesley N T J et al., "*Salvia lavandulaefolia* (Spanish Sage) enhances memory in healthy young volunteers", Pharmacology Biochemistry and Behavior, vol. 75, No. 3, Jan. 1, 2003, pp. 669-674.
Zanotta D et al., "Cognitive effects of a dietary supplement made from extract of Bacopa monnieri, astaxanthin, phosphatidylserine, and vitamin E in subjects with mild cognitive impairment: a noncomparative, exploratory clinical study", Neuropsychiatric Disease and Treatment, vol. 10, Jan. 1, 2014, pp. 225-230.

*Primary Examiner* — Terry A McKelvey
(74) *Attorney, Agent, or Firm* — Silvia Salvadori, P.C.; Silvia Salvadori

(57) ABSTRACT

Association comprising: *Bacopa monnieri* dry extract, Astaxanthin powder, Vitamin E, phosphatidylserine and *Withania somnifera* and optionally an association of an aqueous extract of *Salvia officinalis* and an oily extract of *Salvia lavandulifolia*, for use as a coadjuvant in the prevention of Alzheimer's disease, as it is capable of reducing some of the main modifiable risk factors of cognitive decline associated with Alzheimer's disease and consequently improving memory and cognitive functions.

17 Claims, 3 Drawing Sheets

FOOD SUPPLEMENT FOR USE AS COADJUVANT IN THE PREVENTION AND TREATMENT OF COGNITIVE DECLINE ASSOCIATED WITH ALZHEIMER DISEASE

This application is a U.S. national stage of PCT/IB2022/053781 filed 22 Apr. 2022, which claims priority to, and the benefit of Italian Application No. 102021000012515 filed on 14 May 2021, the contents of which are incorporated herein by reference in their entireties.

SUMMARY OF THE INVENTION

The present invention relates to an oral formulation, particularly for use as a coadjuvant in reducing the major modifiable risk factors of cognitive decline associated with Alzheimer's disease and thereby improving memory and cognitive functions.

BACKGROUND ART

Alzheimer's disease is the most common form of degenerative dementia, capable of leading to a slow and progressive decline in cognitive functions (memory, thinking, learning ability, etc.). Such a form of degenerative dementia begins predominantly in the pre-senile age, while it is particularly rare in people younger than 65.[1]

Cognitive and mental decline is the impairment of intellectual abilities, such as to interfere with daily activities.[2] In addition to being a physiological factor (due to age), cognitive decline can be associated with neurodegenerative diseases such as Alzheimer's disease.[3]

The 2018 Report of the World Health Organization (WHO) reveals alarming growth estimates for dementia: it is assumed that the 35.6 million cases recorded in 2010 will double in 2030 and triple in 2050, where there will be as many as 7.7 million new cases per year, with an impact on the economy of health systems of about 604 billion dollars per year. In Italy more than one million patients with dementia are estimated, of which about 60% with Alzheimer's disease, and about three million people directly or indirectly involved in the care of such patients.[4]

According to a model developed by Barry Reisberg, MD, clinical director of the New York University School of Medicine's Dementia Research Center, the course of Alzheimer's disease can generally be summarized in seven stages of articulation.

Stage 1: no disability (normal cognitive function). The subject suffering from Alzheimer's disease in stage 1 does not show any problems related to memory loss. There is no significant evidence of manifestation of symptoms attributable to the aforesaid form of dementia.

Stage 2: very mild cognitive decline (early signs of Alzheimer's disease). The subject suffering from Alzheimer's disease in stage 2 could manifest the sensation of having memory gaps, which can be detected in their forgetting commonly used words or the position of everyday objects. As with stage 1, no symptoms of dementia can be diagnosed.

Stage 3: mild cognitive decline (early stage Alzheimer's disease). Some people show obvious signs of cognitive decline. Memory or concentration loss can be detected through an accurate medical examination.

Stage 4: moderate cognitive decline (mild or early stage Alzheimer's disease). The following symptoms can be detected through an accurate medical examination:

Forgetfulness of recent events;
Compromised ability to perform demanding arithmetic calculations;
Greater difficulty in carrying out daily logistical tasks (personal financial management, planning daily activities, etc.);
Forgetfulness of one's own personal history;
Instability in moods and restraint in socially or mentally challenging occasions.

Stage 5: moderately severe cognitive decline (moderate or intermediate stage Alzheimer's disease). Gaps in memory and thinking become evident. Subjects suffering from stage 5 Alzheimer's disease begin to need help carrying out their daily activities.

Stage 6: severe cognitive decline (moderately severe or mid-stage Alzheimer's disease). Memory progressively worsens. Personality changes may occur. Subjects suffering from stage 6 Alzheimer's disease need considerable help carrying out daily activities.

Stage 7: very severe cognitive decline (severe or advanced Alzheimer's disease). Subjects suffering from stage 7 Alzheimer's disease are unable to respond to what is around them or carry on a conversation. In some cases, movement control and motor functions disappear. Therefore, such a subject person needs support carrying out daily activities. They may lose the ability to smile, sit unsupported, and hold their heads up. Their reflexes become abnormal, the muscles stiffen, and the ability to swallow is impaired.[3]

Among the risk factors associated with cognitive impairment, neuro-inflammation and oxidative stress are certainly among the most studied in terms of prevention.

In 2021, a study ("Neuroinflammation and microglial activation in Alzheimer disease: where do we go from here?") published in the journal Nature Reviews Neurology highlighted the key role of neuro-inflammation in the pathogenesis of Alzheimer's disease. The understanding of the mechanisms behind neuro-inflammation is a rather complex and debated topic, however it is known that neuro-inflammation comprises a variety of inflammatory events of the Central Nervous System (CNS) in pathological conditions, relating to the process of activation of the microglia, the main active immune defence in the CNS. The activated microglia has the role of promoting and supporting the neuro-inflammatory state by releasing cytokines (the main markers include TNF-α, "Tumor Necrosis Factor-alpha", a pro-inflammatory cytokine produced by a variety of immune cells), reactive oxygen intermediates, proteases, complement factors and chemokines. Furthermore, the microglial activation process is a complex phenomenon characterized by the acquisition of different functional phenotypes, associated with neuro-toxic and neuro-protective functions. This study showed a correlation between the activated microglia and the influences it exerts on the progression of Alzheimer's disease, depending on the stage of the disease, individual susceptibility and the activation state of the microglia itself.

The activated microglia is a major source of TNF-α in the CNS. The latter is related to the activation of different biological processes, including apoptosis, differentiation, proliferation, survival. Although in basal conditions TNF-α plays an important role in brain development, in particular pathological conditions, increased levels of this cytokine excessively activate the microglia, causing neuronal damage (demyelination and/or neuronal degeneration). The hyperactivated microglia causes the release of cytotoxic molecules, including TNF-α, produced by a positive autocrine activation feedback mechanism.[5]

Although the basic mechanisms by which TNF-α activates the microglia have been identified, specific target molecular mediators, which control microglia hyper-activation and TNF-α-mediated neuro-inflammation, have yet to be identified.[6]

In addition, neuro-inflammation alters the correct expression of the neurotrophic factor BDNF, resulting in an increased risk of neuronal suffering and death. In fact, the neutrophic factors belonging to the Nerve Growth Factor (NGF) family, including BDNF, are potent stimulators of neuronal survival in pathological conditions. A study published in the Journal of Neuroscience has shown that it is possible to preserve the response of neurons of the lateral geniculate body (LGN), which had been injured, through the ocular administration of BDNF.[7]

Free radicals (ROS) also play a decisive role in the development and progression of neurodegenerative diseases such as Alzheimer's disease. In fact, the brain is largely composed of easily oxidizable lipids; moreover, since among the best known free radicals are precisely those with an oxygen content (ROS from Reacting Oxygen Species) and given the high consumption of oxygen by the brain, there is a high risk of free radicals developing in this organ.[8]

In addition to the factors listed above, cognitive impairment and Alzheimer's are also related to the levels of particular neurotransmitters, such as acetylcholine and dopamine.

Acetylcholine is responsible for nerve transmission both at the CNS and peripheral nervous system levels in humans and thus plays an essential role in learning and memory processes.[9]

Already in 1999, some scholars had identified a correlation between cholinergic deficiency and Alzheimer's disease. In fact, Alzheimer's disease is related to a particularly low concentration of acetylcholine in the hippocampus and neocortex, caused by the degeneration of cholinergic neurons.[10]

As a result, acetylcholinesterase inhibitors are among the drugs most commonly used in Alzheimer's patients today. These drugs, which perform the function of inhibiting the enzyme cholinesterase, result in an increase in the concentration of acetylcholine at the synaptic level, ensuring nerve impulse continuity.

On the other hand, dopamine homoeostasis would appear to play a key role in Alzheimer's disease, as evidenced by a 2019 meta-analysis which shows that reduced levels of dopamine neurotransmitters, caused by a cortical dopamine deficiency, are correlated with the pathophysiology of Alzheimer's disease.[11]

SUMMARY OF THE INVENTION

The applicant has now found that an association consisting of: *Bacopa monnieri* dry extract, Astaxanthin, Vitamin E, phosphatidylserine and *Withania somnifera* and optionally an association of an aqueous extract of *Salvia officinalis* and an oily extract of *Salvia lavandulifolia*, can be effectively used in the prevention of Alzheimer's disease, as it is capable of reducing the main modifiable risk factors of cognitive decline associated with Alzheimer's disease.

DETAILED DESCRIPTION OF THE INVENTION

Figure 1:
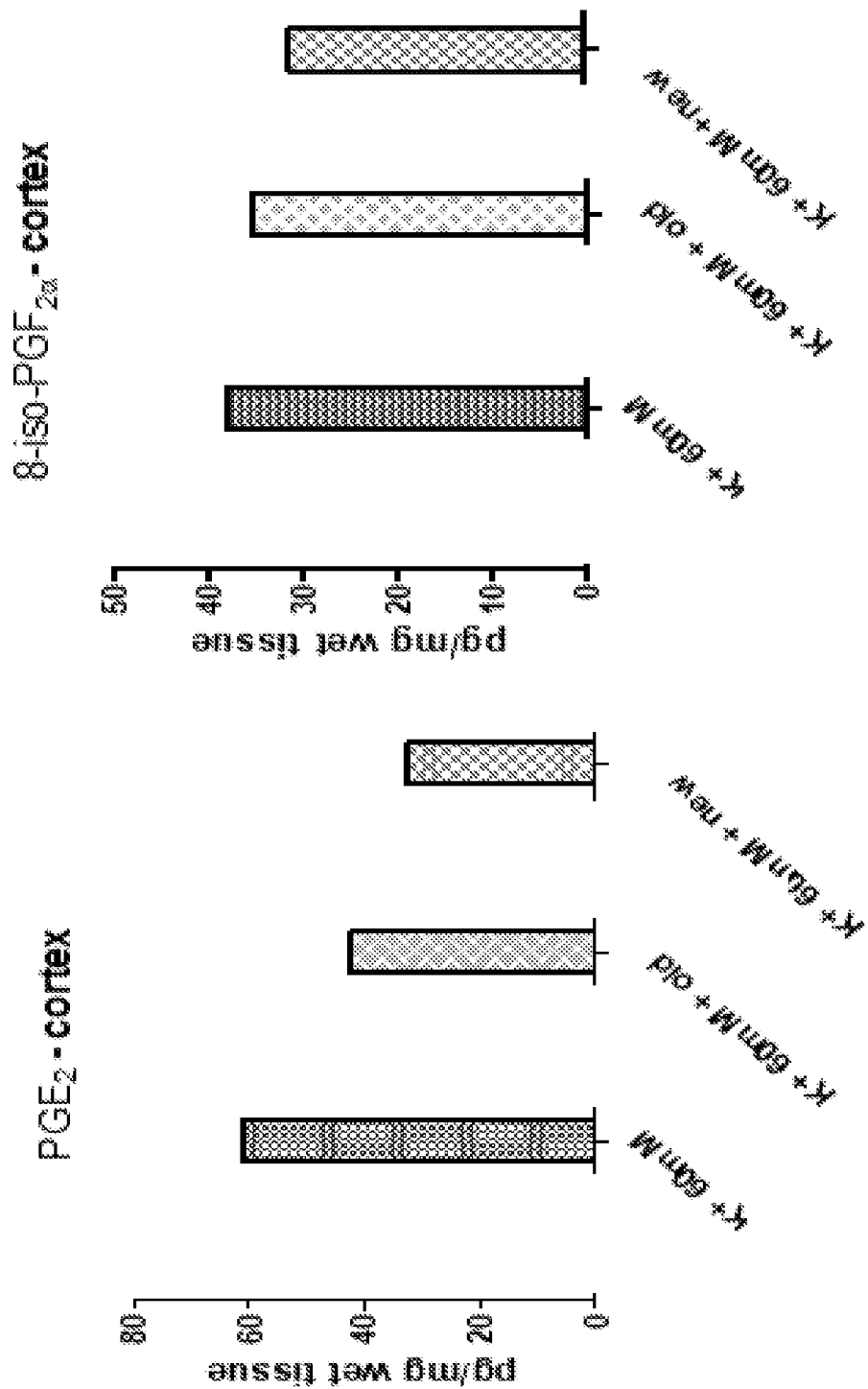
FIG. 1 (test on expression of PGE2 and 8-iso-PGF 2 alpha) depicts a histogram in which the levels of PGE2 and 8-iso-PGF 2 alpha (pg/mg) are compared, in the cortex tissue treated with three different formulations: a $K^+$ 60 mM solution; a $K^+$ 60 mM solution to which the Illumina® formulation is added; a $K^+$ 60 mM solution to which the formulation according to the present invention is added.

For the purposes of the present invention the definition "comprising" does not exclude the possibility that there are additional components in addition to those expressly listed after such a definition; on the contrary the definition "consisting of" excludes the possibility that there are additional components in addition to those expressly listed after such definition.

According to a preferred solution, the association for use, object of the present invention, consists of the aforesaid 5 active ingredients: *Bacopa monnieri*, Astaxanthin, Vitamin E, phosphatidylserine and *Withania somnifera* and optionally an association of an aqueous extract of *Salvia officinalis* and an oily extract of *Salvia lavandulifolia*.

The association for use according to the present invention is preferably contained in oral formulations, as the only active ingredient in combination with suitable excipients and/or diluents.

According to a particularly preferred solution, said oral formulation comprises as the only active ingredient the aforesaid association, in which:

the *Bacopa monnieri* dry extract is contained in an amount between 100 and 300 mg, preferably 150 mg with a minimum bacoside titre of 10%, preferably 20%;

the astaxanthin is contained in amounts preferably between 1 mg astaxanthin and 2 mg, more preferably 1 mg the Vitamin E, preferably as Vitamin E acetate, is preferably contained in said association in an amount between 10 mg and 60 mg, preferably 15 mg;

the phosphatidylserine is preferably contained in said association in an amount between 10 mg and 20 mg, more preferably 15 mg,

*Withania somnifera* is contained in said association in an amount between 100 and 300 mg, preferably 200 mg;

The combination of aqueous extract of *Salvia officinalis* and an oily extract of *Salvia lavandulifolia*, when present, is preferably contained in said association in an amount between 200 and 400 mg, more preferably 300 mg.

The astaxanthin is preferably contained in a dry extract of *Haematococcus pluvialis* Flotow algae, with a minimum astaxanthin titre of 2%, more preferably 5%.

Still more preferably, said oral formulation is in the form of a single-dose sachet dispersible in water.

According to an even more preferred solution, said oral formulation in the form of a single-dose sachet dispersible in water, containing the association for use according to the present invention as the only active ingredient, is administered twice daily.

More preferably, said oral formulation is a food supplement.

The composition of the food supplement in the form of a single-dose sachet, containing as the only active ingredient the association for use according to the present invention is shown below in example 1 for illustrative purposes, and example 2 shows a pre-clinical study demonstrating the efficacy of the association, whose composition is reported in example 1, against the reduction of some of the main modifiable risk factors of the cognitive decline associated with Alzheimer's disease.

Example 1—Food Supplement Formula in the Form of a Single-Dose Sachet

TABLE 1 formula of the food supplement object of the present invention.

|  | For one sachet |
|---|---|
| ACTIVE INGREDIENTS |  |
| Bacopa (*Bacopa monnieri* (l.) pennel, leaves) dry extract 20% | 150 mg |
| Astaxanthin | 1 mg |
| Vitamin E acetate | 15 mg |
| Phosphatidylserine | 15 mg |
| Ashwagandha (*Withania somnifera* (L.) Dunal) | 200 mg |
| EXCIPIENTS |  |
| Silicon dioxide- E551 | 0.1355 mg |
| Polyoxyethylensorbitan monooleate (Polysorbate 80) - E433 | 0.120625 mg |
| Maltodextrins | 1.4015 mg |
| Isomalt - E953 | 0.32817 mg |
| Citric acid - E330 | 0.22 mg |
| Black cherry flavour | 0.179 mg |
| Lemon Flavour | 0.05 mg |
| Wild berry flavour | 0.038 mg |
| Sucralose | 0.024 mg |

Example 2—Pre-Clinical Study

The purpose of the present study is to verify whether the mixture that constitutes the supplement object of the present invention has a reduction action against some modifiable risk factors of cognitive decline associated with Alzheimer's disease The efficacy of the supplement subject of the present invention was evaluated by:

DPPH test (for oxidative stress): chemical test in which the decay of the radical diphenylpicrylhydrazyl (DPPH) is evaluated, in the absence or presence of antioxidants. Such a radical is used to test the ability of substances to act as free radical scavengers. In solution, DPPH has a violet colour, which turns yellowish-colourless when this radical reacts with a hydrogen atom from a scavenger, giving rise to the reduced form DPPH-H.

ABTS test (for oxidative stress): allows to determine the antioxidant power of different biological matrices, by means of the reaction between the sample to be analysed with a radical cation. The latter is generated by means of oxidation of the diammonium salt of 2,2'-azino-bis(3-ethylbenzothiazoline-6-sulfonic acid (ABTS) by a potassium persulfate solution ($K_2S_2O_8$). The radical cation $ABTSy^+$ has a peak absorption at 734 nm and, therefore, is a stable and coloured species. Antioxidant compounds, capable of transferring a hydrogen atom or an electron to the radical cation $ABTSy^+$, cause a discolouration of the solution.

Ex vivo study: application of an experimental model, which involves the use of explanted cortex tissue, for the evaluation of the protective effects on the induced neuronal damage. Such a model involves the selection of the neurotoxic stimulus, induced by β-amyloid peptide, ferrous sulphate or hydrogen peroxide, and the evaluation of the treatment-related effects on such induced stress.

In such a study, the following are evaluated:

Gene expression of neuroprotection factors, such as BDNF;

Inflammatory response marker (PGE2 and 8-iso-PGF2 alpha release dose);

Expression of TNF-alpha.

Enzyme assays: in vitro assessment of the cholinesterase inhibitory effect

Dosage of DOPAC, dopamine metabolite.

Results

The results obtained from the tests conducted, for the present formulation, were compared with those obtained for the similar Illumina® formulation, in which the ingredient *Withamnia somnifera* is absent. The results are displayed in Tables 2 and 3 and in FIGS. 1, 2, 3 and 4.

TABLE 2

Comparison % inhibition of AChE and BChE activity for *Withamnia Somnifera*, for the composition of the invention and for the commercial formulation Illumina ®.

|  | % AChE Activity Inhibition |
|---|---|
| *Withamnia somnifera* - 1 mg/mL | 41.3% |
| Illumina ® - 1 mg/mL | <1% |
| Composition of the invention - 2.5 mg/mL (1 mg/mL *Withamnia somnifera*) | 55.8% |
|  | % BChE Activity Inhibition |
| *Withamnia somnifera*- 1 mg/mL | 31.4% |
| Illumina ® - 1 mg/mL | 12.1% |
| Composition of the Invention - 2.5 mg/mL (1 mg/mL *Withamnia somnifera*) | 42.2% |

Table 2 shows the increased efficacy of the composition of the present invention, compared to the commercially available formula Illumina® and *Withamnia somnifera*, both for the inhibition of acetylcholinesterase activity and for the inhibition of butyrylcholinesterase activity, two key enzymes in the process of acetylcholine degradation.

TABLE 3

DPPH and ABTS comparison test for the composition of the invention and for the commercial formulation Illumina ®

|  | DPPH ($IC_{50}$) | ABTS ($IC_{50}$) |
|---|---|---|
| Illumina ® | 3.35 ± 0.51 | 3.45 ± 0.08 |
| Composition of the invention | 2.26 ± 0.11 | 2.91 ± 0.09 |

Table 3 shows a greater efficacy of the formula object of the invention compared with the commercial formula Illumina®, evaluated on the basis of the $IC_{50}$ value, which expresses the minimum mixture concentration necessary to have a 50% inhibition of DPPH and ABTS radicals.

FIG. 1 (test on PGE2 and 8-iso-PGF2 alpha expression): the cortex tissue is treated with a potassium-based solution (left histogram), used as an inflammatory stimulus for raising PGE2 and 8-iso-PGF2 alpha levels. The treatment with the formula object of the present invention (identified as "new" right histogram) offers a greater benefit with respect to the commercial formulation Illumina® (identified in the figure as "old" in the central histogram).

Figure 2:
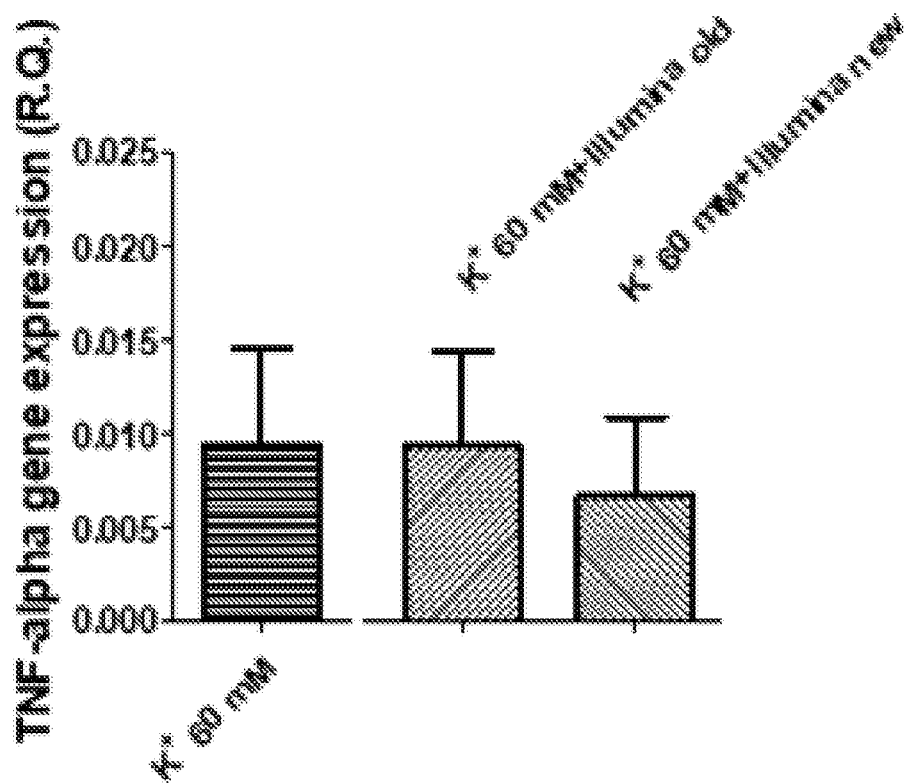
FIG. 2 (TNF-alpha level test) depicts a histogram comparing gene expression (R.Q. values) for TNF-alpha, in cortex tissue treated with three different formulations: a $K^+$ 60 mM solution; a $K^+$ 60 mM solution to which the Illumina® formulation is added; a $K^+$ 60 mM solution to which the formulation according to the present invention is added.

FIG. 2 (TNF-alpha levels test): The histogram confirms the greater efficacy of the product object of the present invention (indicated as "Illumina new"), with respect to the commercially available composition Illumina® (indicated as "Illumina old"), in reducing the expression of TNF-alpha, one of the pro-inflammatory cytokines most involved in neuro-inflammation.

Figure 3:
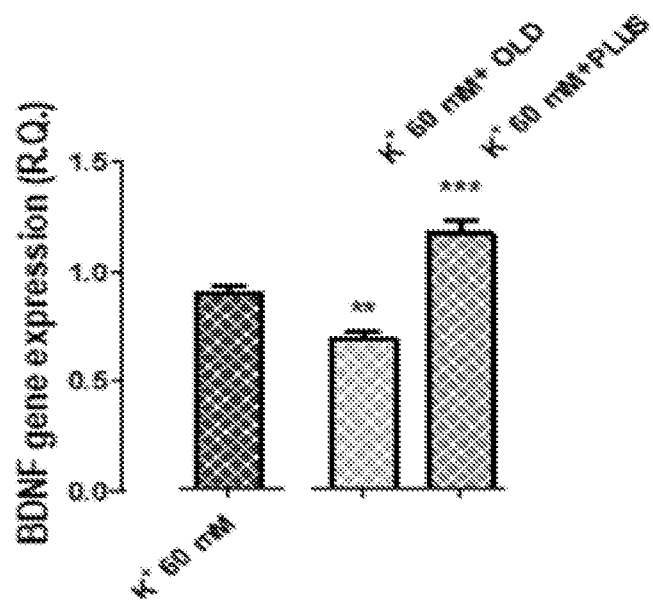
FIG. 3 (BDNF level test) depicts a histogram comparing gene expression (R.Q. values) for BDNF in cortex tissue treated with three different formulations: a $K^+$ 60 mM solution; a $K^+$ 60 mM solution to which the Illumina® formulation is added; a $K^+$ 60 mM solution to which the formulation according to the present invention is added.

FIG. 3 (BDNF level test): The graph shows how the treatment with the formula of the present invention (right histogram identified with "PLUS") offers greater efficacy with respect to the commercially available formulation Illumina® (central histogram indicated with "old"), as can be seen from the analysis of gene expression for BDNF, a neurotrophic factor involved in neuronal degeneration and neuro-inflammatory development.

Figure 4:
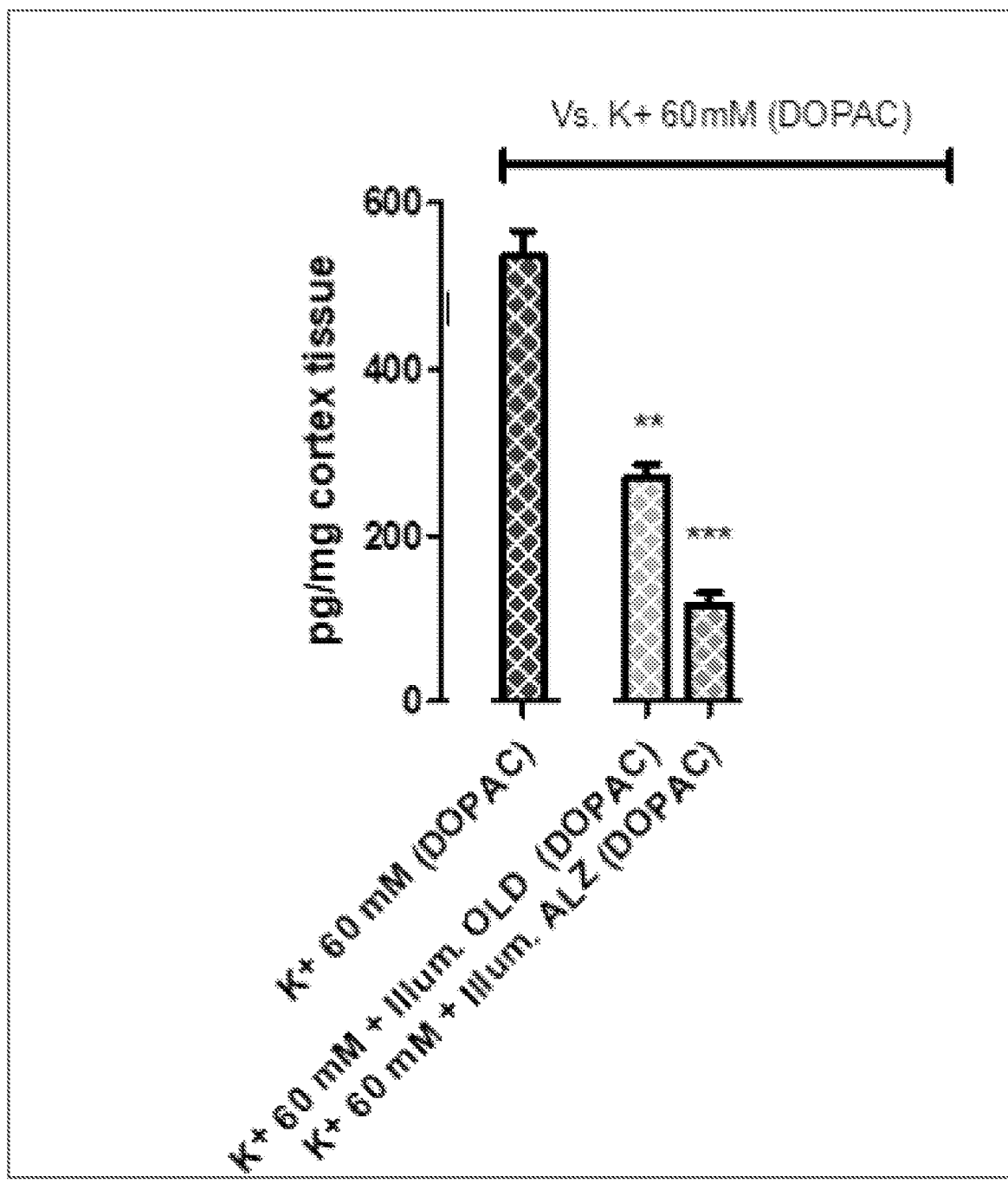
FIG. 4 (dopamine protection test) depicts a histogram comparing DOPAC levels in cortex tissue treated with four different formulations: a $K^+$ 60 mM solution; the $K^+$ 60 mM solution to which a half dose of the Illumina® formulation is added and a $K^+$ 60 mM solution to which the Illumina® formulation is added; a $K^+$ 60 mM solution to which the formulation according to the present invention is added.

FIG. 4 (dopamine protection test): the cortex tissue is treated with a potassium-based solution (left histogram), as an inflammatory stimulus for raising the levels of DOPAC, the metabolite of dopamine that is generated as a result of the degradation of such a neurotransmitter. The graph demonstrates how the formula object of the present invention (right histogram identified as Illumina ALZ) further reduces DOPAC expression with respect to the commercially available formulation Illumina® (Illumina OLD central histogram).

BIBLIOGRAPHY

1. Brookmeyer R, Gray S, Kawas C. Projections of Alzheimer's disease in the United States and the public health impact of delaying disease onset. Am J Public Health. 1998 September; 88(9):1337-42.
2. www.issalute.it/index.php/la-salute-dalla-a-alla-z-menu/d/declino-cognitivo-mentale
3. www.alz.org/it/stadi-del-morbo-di-alzheimer.asp
4. www.epicentro.iss.it/alzheimer/iniziative-mondo
5. Leng F, Edison P. Neuroinflammation and microglial activation in Alzheimer disease: where do we go from here? Nat Rev Neurol. 2021 March; 17(3): 157-172. TNF-alpha-induced microglia activation requires miR-342: impact on NF-kB signaling and neurotoxicity. Cell Death & Disease volume 11, Article number: 415 (2020).
6. Lima Giacobbo B, Doorduin J, Klein H C, Dierckx R A J O, Bromberg E, de Vries E F J. Brain-Derived Neurotrophic Factor in Brain Disorders: Focus on Neuroinflammation. Mol Neurobiol. 2019 May; 56(5): 3295-3312. J. Neurosci. 23:287-296, 2003.
7. Huang W J, Zhang X, Chen W W. Role of oxidative stress in Alzheimer's disease. Biomed Rep. 2016 May; 4(5):519-522. The cholinergic hypothesis of Alzheimer's disease: a review of progress. J Neurol Neurosurg Psychiatry 1999; 66:137-147.
8. Pan X, Kaminga A C, Wen S W, Wu X, Acheampong K, Liu A. Dopamine and Dopamine Receptors in Alzheimer's Disease: A Systematic Review and Network Meta-Analysis. Front Aging Neurosci. 2019; 11:175. Published 2019 Jul. 11.

The invention claimed is:

1. A method for reducing some of the main cognitive decline risk factors associated with Alzheimer's disease in a subject in need thereof, said method consisting of
administering, as an adjuvant, an effective amount of an association of: *Bacopa monnieri* dry extract, astaxanthin powder, Vitamin E, phosphatidylserine, *Withania somnifera* and optionally an association of an aqueous extract of *Salvia officinalis* and an oily extract of *Salvia lavandulifoliato* to said subject in need thereof.

2. The method according to claim 1, wherein said main risk factors are: neuro-inflammation from oxidative stress, alteration of neurotrophic factors expression, alteration of acetylcholine and dopamine mediated neurotransmission.

3. The method according to claim 1, wherein said association is administered orally in a formulation suitable to be orally administered, said association being in combination with suitable excipients and/or diluents in said formulation.

4. The method according to claim 3, wherein said formulation suitable to be orally administered contains between 100 and 300 mg of *Bacopa monnieri* with a minimum bacoside titre of 10%.

5. The method according to claim 3, wherein said formulation suitable to be orally administered contains 150 mg of *Bacopa monnieri* with a minimum bacoside titre of 20%.

6. The method according to claim 3, wherein said formulation suitable to be orally administered contains between 1 mg and 2 mg of astaxanthin.

7. The method according to claim 3, wherein said formulation suitable to be orally administered contains 1 mg of astaxanthin.

8. The method according to claim 3, wherein said formulation suitable to be orally administered contains Vitamin E as vitamin E acetate in an amount between 10 mg and 60 mg.

9. The method according to claim 3, wherein said formulation suitable to be orally administered contains Vitamin E as vitamin E acetate in an amount of 15 mg.

10. The method according to claim 3, wherein said formulation suitable to be orally administered contains between 10 mg and 20 mg of phosphatidylserine.

11. The method according to claim 3, wherein said formulation suitable to be orally administered contains 15 mg of phosphatidylserine.

12. The method according to claim 3, wherein said formulation suitable to be orally administered contains between 100 and 300 mg of *Withania somnifera*.

13. The method according to claim 3, wherein said formulation suitable to be orally administered contains 200 mg of *Withania somnifera*.

14. The method according to claim 3, wherein said formulation suitable to be orally administered contains a total amount between 200 to 400 mg of *Salvia officinalis* aqueous extract and *Salvia lavandulifolia* oily extract.

15. The method according to claim 3, wherein said formulation suitable to be orally administered contains a total amount of 300 mg of *Salvia officinalis* aqueous extract and *Salvia lavandulifolia* oily extract.

16. The method according to claim 3, wherein said formulation suitable to be orally administered is a single-dose sachet dispersible in water and is administered twice a day.

17. The method according to claim 3, wherein said formulation suitable to be orally administered, is a dietary supplement.

* * * * *